Patented Aug. 22, 1950

2,520,042

UNITED STATES PATENT OFFICE 2,520,042

PROCESS FOR PRODUCING 4-HYDROXY-2-CARBOXYQUINOLINE COMPOUNDS

George F. Lisk, Buffalo, and Gardner W. Stacy, New York, N. Y., assignors to the United States of America as represented by the Secretary of War No Drawing. Application June 20, 1947, Serial No. 756,083

6 Claims. (Cl. 260—287)

1

The present invention relates to an improved process for producing organic compounds suitable for use as intermediates for the preparation of antimalarial pharmaceuticals.

More particularly, the present invention deals with a process for producing 4-hydroxyquinoline-2-carboxylic acid compounds.

It is known to prepare 4-hydroxyquinoline-2-carboxylic acids by reacting a primary arylamine, which is unsubstituted in at least one of the positions ortho to said amino group, with an ester of oxalacetic acid, for instance, the diethyl ester, to form the anil, heating the anil thus formed to an elevated temperature, such as 250° C. to effect cyclization and formation of the corresponding ester of a 4-hydroxyquinoline-2-carboxylic acid, and saponifying the ester to the carboxylic acid. The reactions may be presented as follows, using aniline as a typical primary amine and diethyl oxalacetate as a typical ester of oxalacetic acid:

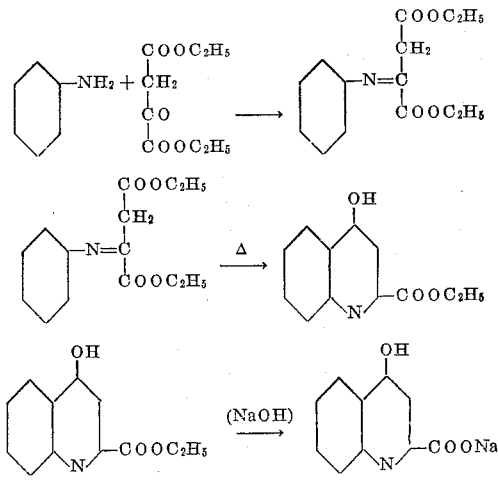

When the arylamine is unsubstituted in both of the ortho positions with respect to the amino group and is also substituted in a position meta to the amino group, a mixture of isomeric compounds may be formed in the cyclization step.

In carrying out the foregoing synthesis in accordance with the prior art, it has been customary first to prepare the anil separately in relatively pure form, and then to introduce the anil thus prepared into an inert, high-boiling solvent, e. g., paraffin oil or phenanthrene, in which the cyclization is performed advantageously, as compared to a process operated in the absence of such solvents, to effect the cyclization with formation of the quinoline compound.

2

The tedious and expensive preparation and isolation of the anil in purified form prior to the cyclization step has been thought, in accordance with the prior art, to be a prerequisite of a satisfactory cyclization reaction. This, for example, Surrey and Hammer, 68 J. A. C. S. (1946) 113, state that "practically all of the unreacted arylamine can and should be removed, in the isolation of the anil, inasmuch as small amounts of the arylamine interfere with the expected reaction in step 2 (cyclization to a 4-hydroxyquinoline-2-carboxylate)."

This 4-hydroxyquinoline-2-carboxylate is a very satisfactory intermediate for the preparation of compounds having antimalarial properties, which compounds are of the 4-hydroxyquinoline type.

In accordance with the present invention, it has been discovered that the aforementioned two-stage process and disadvantages thereof are avoided, and that yields of 4-hydroxyquinoline-2-carboxylic acids equal to those obtained by the aforesaid two-stage process can be obtained by carrying out the formation of the anil from a primary arylamine and an oxalacetic ester, and then without isolation or purification of the anil, effecting cyclization thereof to the corresponding 4-hydroxyquinoline-2-carboxylate compound by heating to cyclization temperature in diphenyl ether or other inert, high-boiling solvent. It was not to be foreseen that such high yields of quinoline compound could be obtained by heating to cyclization temperature the reaction mixture obtained in the formation of the anil, especially in view of the well-established principle in the prior art that the presence of impurities other than the anil interferes with the formation of the desired 4-hydroxyquinoline-2-carboxylic acid compound.

The process of the present invention will be understood by reference to the following illustrative example:

EXAMPLE

A. *Formation of the anil from m-chloraniline and oxalacetic diethylester*

42.5 parts by weight (0.33 mol) of m-chloraniline were dissolved in 1580 parts by weight of an eutectic mixture of diphenyl ether and substantially 26.5% of diphenyl, the mixture melting at substantially 12° C. and boiling at substantially 258° C., which mixture may be purchased on the market under the trade name "Dowtherm." 44 parts by weight (0.38 mol) 20° Bé. hydrochloric acid were added to the agitated solution slowly (15-20 minutes) to promote the formation of small particles of m-chloraniline hydrochloride. Gaseous carbon dioxide then was passed through the agitated solution at a rate of 8 to 9 liters per minute for 30 minutes to aid in further breaking up the particles of the hydrochloride. 70 parts by weight (0.33 mol) of sodium oxalacetic diethyl ester were added, and the agitated reaction mass was heated to 60° C. and maintained at that temperature for three hours, during all of which steps the aforesaid stream of carbon dioxide gas was continuously passed through the reaction mixture for the purpose of removing water generated in the reaction and thus promoting the formation of the anil.

B. Cyclization to form ethyl esters of 5- and 7-chloro-4-hydroxyquinoline 2-carboxylic acid The mixture thus obtained from A, above, was heated to substantially 250° C. during 15 to 20 minutes, and agitated at that temperature for 10 minutes to complete the cyclization, the alcohol and the other volatile matter distilling during this step being collected separately.

C. Saponification of the mixed quinoline carboxylic acid-esters

The mass obtained from B, above, was cooled to about 100° C. and 540 parts by weight of water and 160 parts of substantially 50% aqueous sodium hydroxide were added. The resulting mixture was heated to boiling, and refluxed for ¾ hour to saponify the ethyl esters of 5- and 7-chloro-4-hydroxyquinoline-2-carboxylic acids formed in the cyclization step. The reaction mass then was allowed to stratify and the aqueous phase was separated from the "Dowtherm" layer. The aqueous portion was agitated hot with 10 parts by weight of decolorizing carbon, and filtered. The filtrate was cooled and rendered acid to Congo red with about 230 parts by weight of 20° Bé. hydrochloric acid to precipitate the free quinoline carboxylic acids. The latter were separated by filtration, washed with a small amount of cold water, and dried.

By operating in the foregoing manner, a yield of chloro-hydroxyquinoline carboxylic acids (as a mixture of isomeric 5- and 7-chloro-4-hydroxyquinoline-2-carboxylic acids) amounting to 75% of theory can be obtained consistently, while yields as high as 90% of theory have been obtained.

In similar manner, good yields of corresponding 4-hydroxyquinoline-2-carboxylic acids can be obtained by replacing m-chloraniline in the original reaction mixture with a molecular equivalent proportion of aniline, p-anisidine, and 3-chloro-2-methylaniline.

Substantially similar results as those obtained in the foregoing example can be obtained if in the cyclization step, a much longer period, namely, 2 hours, is taken to raise the temperature to 250° C. and a similar period employed to cool the reaction mass, as is necessary in large scale batch operations.

Essentially similar results can be obtained by employing diphenyl ether instead of the "Dowtherm." Diphenyl ether solvents are particularly suitable for use in the present process, since they are cheap, inert, high-boiling, and reusable many times in the process and possess high fluidity at low temperatures, which facilitates filtration and other mechanical operations.

It will be understood that the present invention is not limited to a process where the anil is prepared in a diphenyl ether solvent, and the cyclization carried out thereafter in situ, as illustrated in the above example, but the process of the invention may be extended to any process wherein the anil is not isolated and purified before it is cyclized to the 4-hydroxyquinoline-2-carboxylate compound. Thus, for example, the advantages of the present improved process can be realized by carrying out the preparation of the anil in the presence or absence of solvents commonly employed for the purpose, e. g., ethyl alcohol, glacial acetic acid, or toluene, then incorporating diphenyl ether with the reaction mass thus obtained, and heating the resulting mixture to cyclization temperatures, the low-boiling solvent employed in the formation of the anil being volatilized and removed during this operation. Thus, for example, the reaction mass from the preparation of the anil may be added gradually to diphenyl ether preheated to cyclization temperatures, whereupon volatile materials, e. g., ethyl alcohol solvent, are distilled off rapidly. Also, instead of diphenyl ether, there may be employed other inert, high-boiling solvents suitable for effecting the cyclization step, e. g. paraffin oil or phenanthrene.

Our copending application, Serial No. 756,085, now Patent No. 2,520,043, filed of even date herewith, describes the preparation of a specific compound, namely 8-methyl-4,7-dichloroquinoline by the aid of the method disclosed in the present application.

From the foregoing, it will be apparent that the process of the present invention is susceptible to various modifications without departing from the spirit of the invention, and it will be understood that it is intended and desired to embrace within the scope of this invention such modifications and changes as may be necessary or desired to adapt it to varying conditions and uses, as defined in the appended claims.

Having thus described our invention, what we claim as new and wish to secure by Letters Patent is:

1. The process for preparing a 2-carboxy-4-hydroxyquinoline, which comprises preparing a solution in an inert high-boiling organic solvent of a known molal concentration of a mononuclear primary arylamine hydrochloride wherein a position ortho to the primary amino group is unsubstituted, adding to the solution an amount of sodium oxalacetic ester substantially equal molally to that of the arylamine, heating the mixture at an anil-forming temperature until the anil is formed, heating the mixture further to a cyclizing temperature until the anil in the mixture is cyclized to a 4-hydroxyquinoline-2-carboxylate compound, saponifying the said compound, and recovering a 2-carboxy-4-hydroxyquinoline.

2. In a process for preparing 4-hydroxy-2-carboxyquinoline compounds by reacting a solution in an inert high-boiling solvent of the hydrochloride of a mononuclear primary arylamine having an unsubstituted ortho position with reference to the amino group, with an oxalacetic ester, whereby the reactants are converted into a corresponding anil which is cyclized by heating to the corresponding 4-hydroxyquinoline-2-carboxylate compound, the improvement which consists in heating the formed anil-containing reaction mixture, produced from the reaction of the arylamine and ester, to cyclizing temperature for the anil.

3. The process for preparing a mixture comprising essentially 5- and 7-chloro-4-hydroxyquinoline-2-carboxylic acid, which comprises dissolving m-chloraniline hydrochloride in a high-boiling inert organic solvent comprising diphenyl ether, adding to the resulting solution a sodium oxalacetic ester, heating the resulting mixture to reaction temperature and continuing the heating until the reactants have been substantially converted into the anil, cyclizing the anil in situ by heating the resulting reaction mixture containing the anil to cyclizing temperature for the anil in the mixture, and saponifying the resulting compound in the presence of the inert high-boiling organic solvent into a free quinoline carboxylic acid.

4. The process of claim 3 wherein the organic solvent consists essentially of diphenyl ether and diphenyl, the added sodium salt of the ester is sodium oxalacetic diethyl ester, and the cyclizing temperature is from approximately 240° C. to approximately 260° C.

5. In a process for preparing 4-hydroxy-2-carboxyquinoline compounds by reacting a solution in an inert, high-boiling organic solvent comprising diphenyl ether of a mononuclear, primary arylamine having an unsubstituted ortho position in relation to the amino group, with an oxalacetic ester, whereby the reactants are converted into a corresponding anil which is cyclized by heating to the corresponding 4-hydroxyquinoline-2-carboxylate compound, the improvements which consist in heating the formed anil-containing reaction mixture, produced from the arylamine and ester to cyclizing temperature for the anil, the heating being carried out in the presence of the high-boiling solvent and without separating the anil from the reaction mixture, and saponifying the resulting cyclized product in the presence of the said solvent to a free quinoline carboxylic acid.

6. In the process for preparing 4-hydroxyquinoline-2-carboxylic acid compounds, wherein a mononuclear primary arylamine having an unsubstituted ortho position in relation to the amino group is condensed with an oxalacetic ester to form an anil and the anil is thermally cyclized by heating to form the corresponding ester of a 4-hydroxyquinoline-2-carboxylic acid, the improvement which consists in forming the anil in an inert solvent consisting essentially of diphenyl ether and effecting cyclization of the anil in the reaction mass without isolation or purification of the anil from the said mass.

GEORGE F. LISK.
GARDNER W. STACY.

REFERENCES CITED

The following references are of record in the file of this patent:

Steck et al., J. Am. Chem. Soc., vol. 68, pp. 129–132 (Jan. 1946).

Price et al., J. Am. Chem. Soc., vol. 68, pp. 1204–1208.

Breslow et al., J. Am. Chem. Soc., vol. 68, pp. 1232–1238.